May 27, 1958  R. MONRO ET AL  2,835,899
COMBINATION HOOD AND CARRIER POCKET
Filed May 12, 1952  7 Sheets-Sheet 1

INVENTORS
Randolph Monro
Pearl Elizabeth Lackey
BY
ATTORNEY

May 27, 1958  R. MONRO ET AL  2,835,899
COMBINATION HOOD AND CARRIER POCKET
Filed May 12, 1952  7 Sheets-Sheet 2
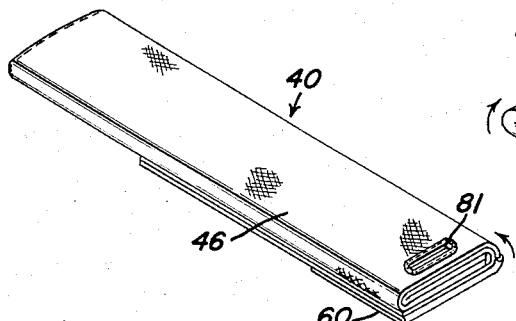
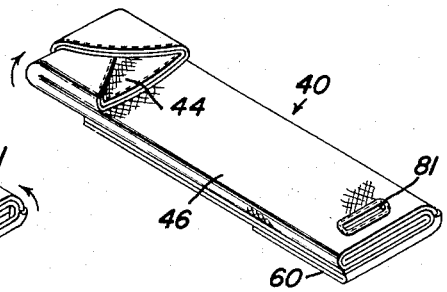
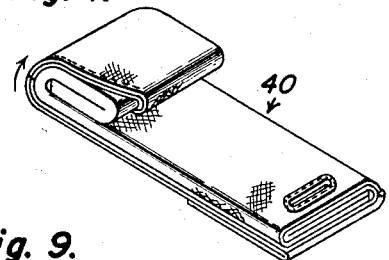
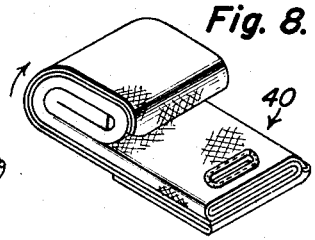
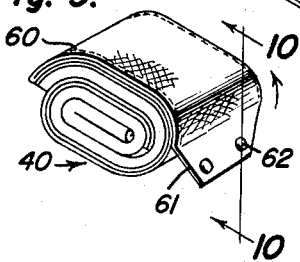
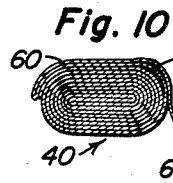
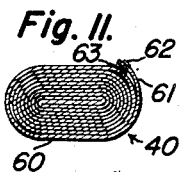
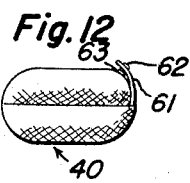
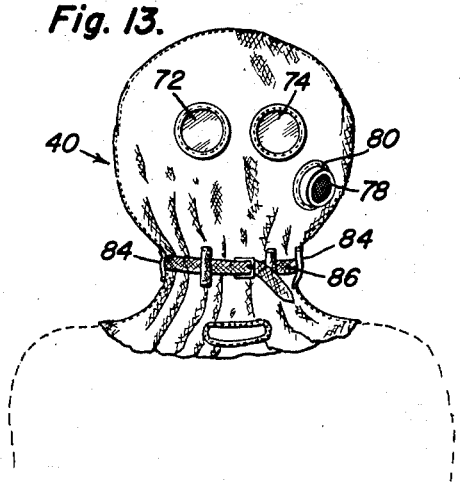
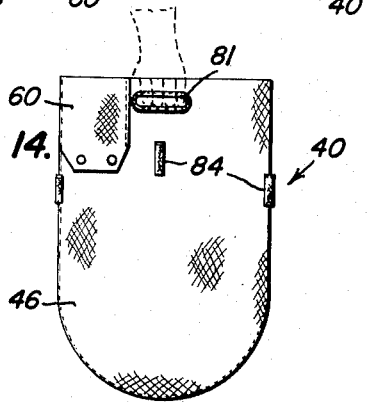
INVENTORS
Randolph Monro
Pearl Elizabeth Lackey
BY
*Carlton C. Davis*
ATTORNEY May 27, 1958  R. MONRO ET AL  2,835,899
COMBINATION HOOD AND CARRIER POCKET
Filed May 12, 1952  7 Sheets-Sheet 3

INVENTORS
Randolph Monro
Pearl Elizabeth Lackey
BY
Carlton C. Davis.
ATTORNEY

May 27, 1958 R. MONRO ET AL 2,835,899
COMBINATION HOOD AND CARRIER POCKET
Filed May 12, 1952 7 Sheets-Sheet 4
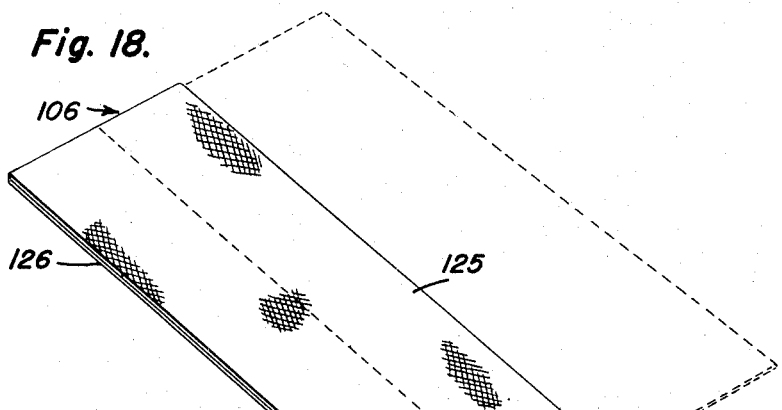
Fig. 18.
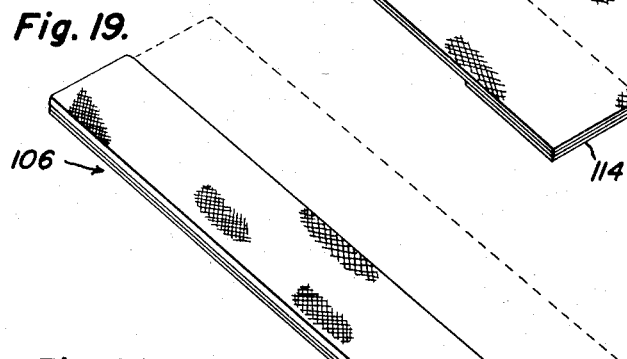
Fig. 19.
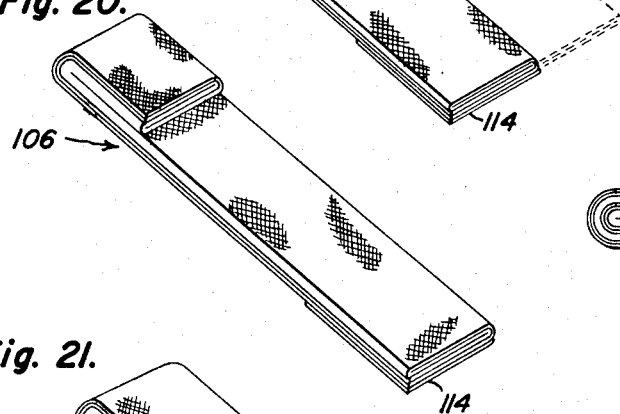
Fig. 20.
Fig. 21.
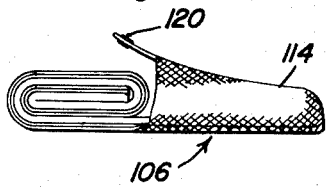
Fig. 22.
INVENTORS
Randolph Monro
Pearl Elizabeth Lackey
BY
ATTORNEY

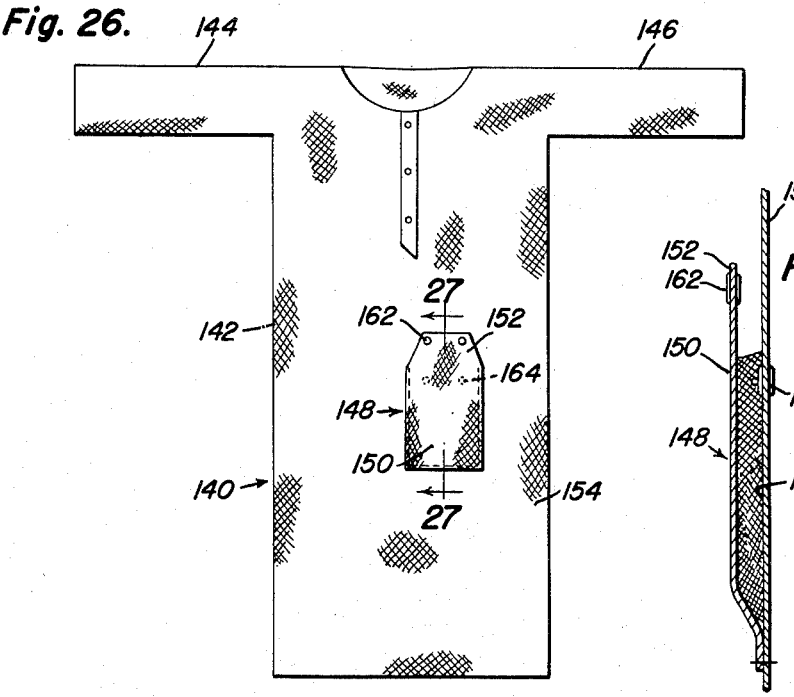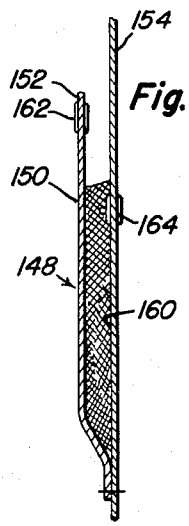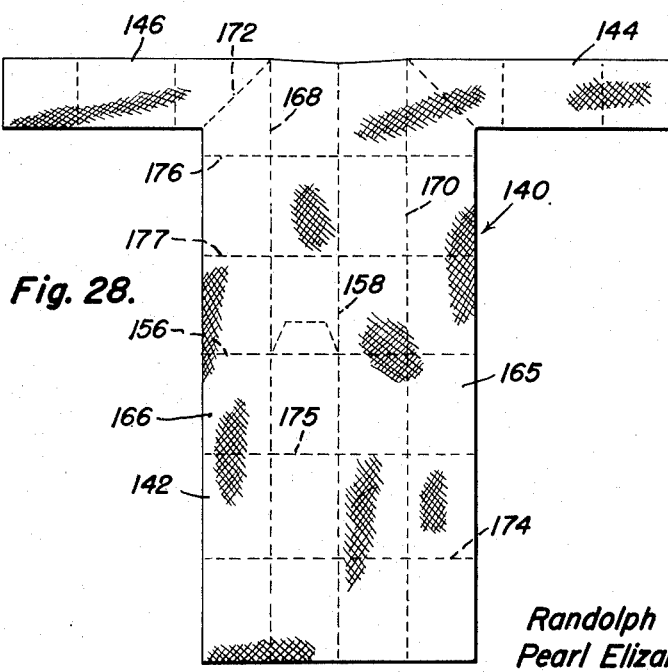

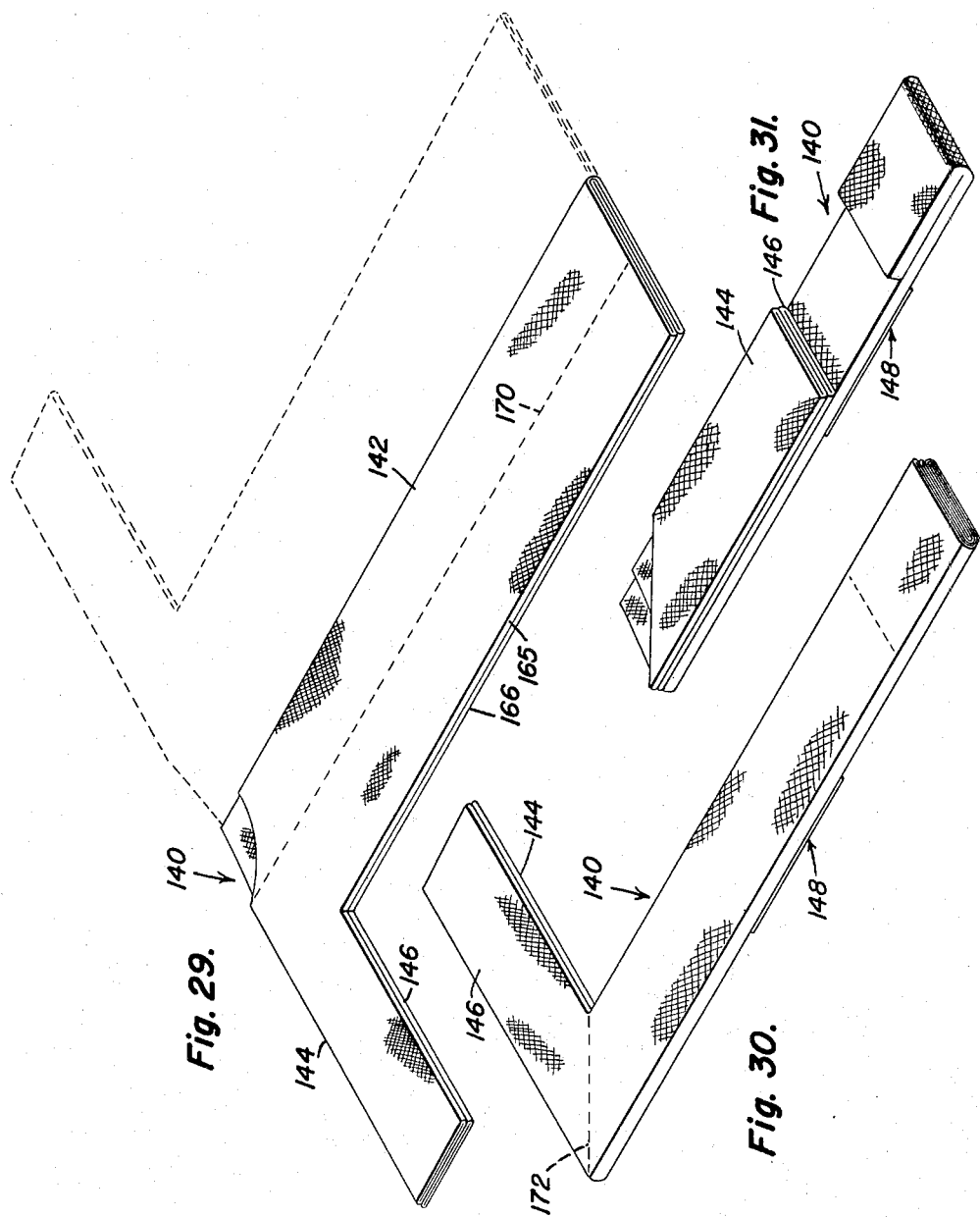

May 27, 1958 R. MONRO ET AL 2,835,899
COMBINATION HOOD AND CARRIER POCKET
Filed May 12, 1952 7 Sheets-Sheet 7
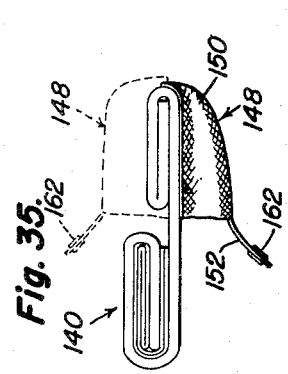
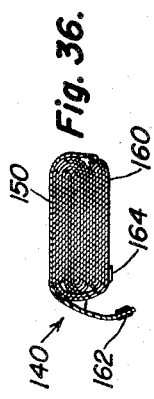
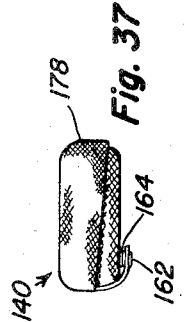
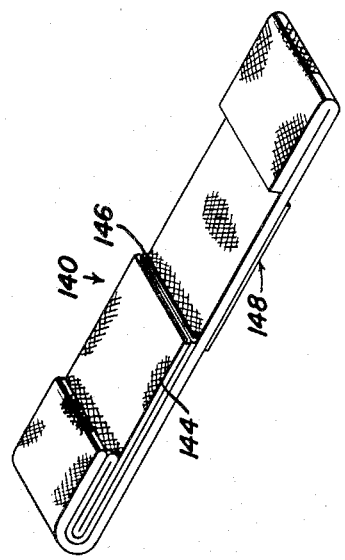
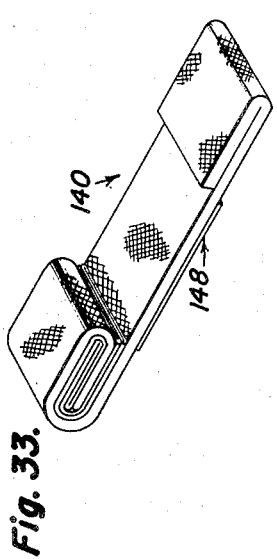
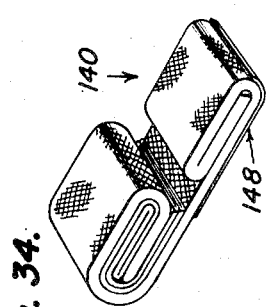
INVENTORS
Randolph Monro
Pearl Elizabeth Lackey
BY
ATTORNEY United States Patent Office 2,835,899
Patented May 27, 1958

2,835,899

COMBINATION HOOD AND CARRIER POCKET

Randolph Monro, Mountain Village, and
Pearl Elizabeth Lackey, Edgewood, Md.

Application May 12, 1952, Serial No. 287,408

2 Claims. (Cl. 2—202)

(Granted under Title 35, U. S. Code (1952), sec. 266)

The invention described herein may be manufactured and used by or for the Government, for governmental purposes, without the payment to us of any royalty thereon.

Our invention relates to, and its chief purpose is the provision of an improved pocket in a flexible foldable dry goods article whereby the article may be made a packet.

Another object is the provision of a pocket of the character described in a combination hood and carrier means.

A further object is the provision of a pocket of the character described in the hood disclosed in the application for patent, Serial No. 642,772 of Randolph Monro (one of the applicants) for an improvement in "Leakproof Gas Masks" filed in the Patent Office January 22, 1946, now abandoned.

A further purpose is the provision of a pocket of the character described in any suitable piece of fabric, such as for illustration, a garment, blanket or handkerchief.

The further objects and purpose of our invention will become more apparent as the specification proceeds, and from the appended claims and the accompanying drawings.

Figures 4 to 9 inclusive and Figure 12 are views illustrating one way in which the hood may be folded and inserted into its pocket.

Figure 10 is a section taken along the line 10—10 of Figure 9.

Figure 11 is a cross sectional view of the closed pocket shown in Figure 12.

Figure 13 is a perspective view showing the hood equipped with gas mask elements and being used as a gas protector.

Figure 14 is a side view showing the hood being used as a market bag.

Figure 15:
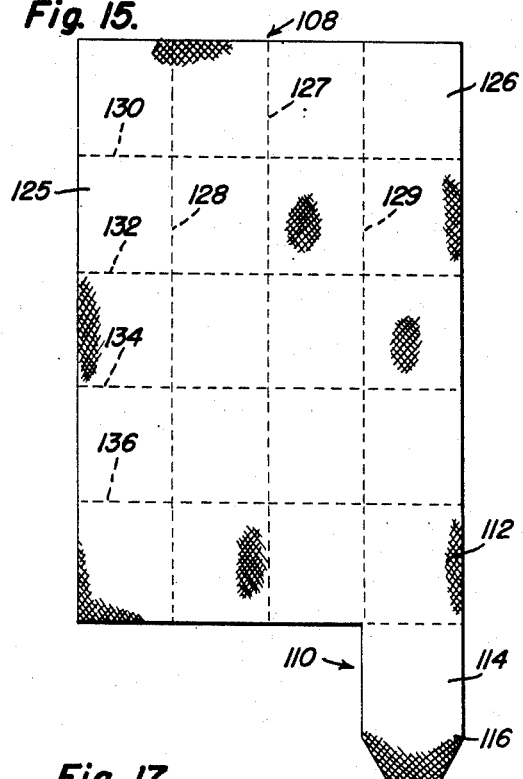

Figure 15 is a plan view of a pattern for a blanket incorporating another form of our invention.

Figure 16:
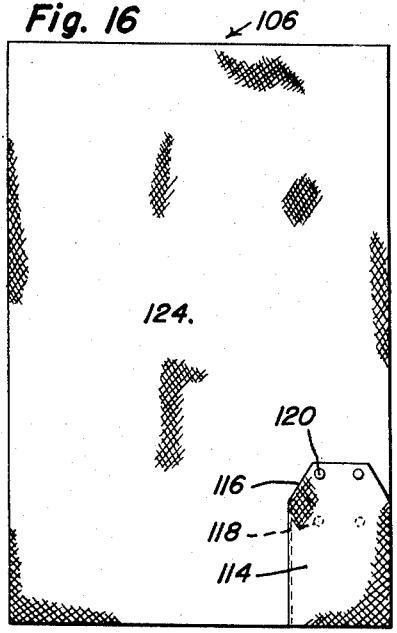

Figure 16 is a plan view showing the blanket referred to in Figure 15 provided with a pocket.

Figures 17 to 25 inclusive are views which illustrate, in sequence, the steps of a method for placing the blanket in its pocket.

Figure 26 is a front plan view of a nightgown provided with a pocket in which our invention is incorporated.

Figure 27 is a section taken along the line 27—27 of Figure 26.

Figures 28 to 37 are views illustrating how the nightgown of Figure 26 may be encased by its pocket.

Figure 1:
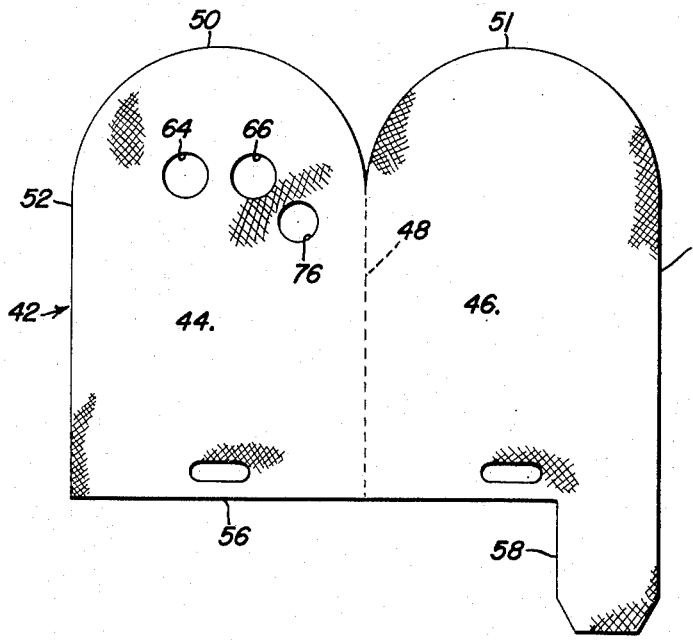
Figure 1 is a plan view of a cut out sheet or pattern which is used in making the preferred form of our invention.
Figure 38:
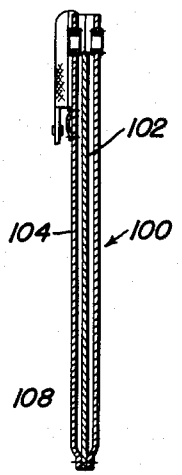
Figure 2:
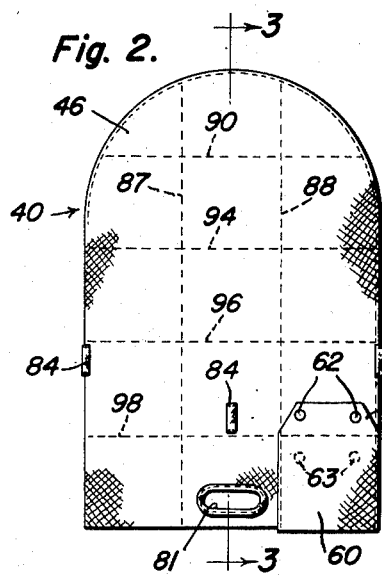
Figure 2 is a plan view showing the side and top edges of the pattern of Figure 1 sewn together to form a gas mask hood embodying the preferred form of our invention.
Figure 3:
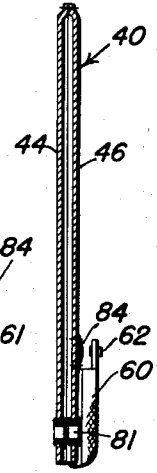
Figure 3 is a sectional view taken along the line 3—3 of Figure 2.
Figure 4:
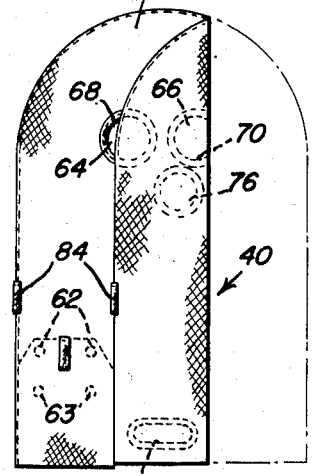

Figure 38 sectionally illustrates a modification of the hood shown in Figures 2 and 3.

In the above figures we have shown, for the purpose of illustration, three different kinds of dry goods articles in which our invention is incorporated but it will of course be understood that our pocket improvement provides a pliable pocket and may be also incorporated in any other flexible dry goods article which is foldable whether it be knitted, woven or made of plastic sheet material.

The preferred modification of our invention and a method of enveloping a dry goods article, including the same, is illustrated in Figures 1 to 14 inclusive. In this modification, it is shown incorporated in a combination gas mask hood and carrier 40 (hereinafter referred to as hood) which may be made of any suitable water proof and gas proof fabric in a manner well known to the protective clothing art. This hood is conveniently made by cutting out a pattern 42 into a front side 44 and a rear side 46 which are connected together at the longitudinal seam line 48 of the pattern. These sides may be made in any suitable shape but in the specific hood shown in Figures 2, 3 the sides 44, 46 have upper arcuate edges 50, 51 and longitudinally extending outside edges 52, 54. The lower edge 56 of the pattern extends at a right angle to these outside edges 52, 54, except that there is provided on the side 46 an extension or flap 58 which is to be folded back upon and sewn to this side (see Fig. 2) in such a manner to provide a pocket 60 having a movable pocket lapel 61.

We have also provided snap fasteners 62, 63 secured to the lapel 61 and the side 46 in such positions that the lapel may be snapped to the side 46 after the main body portion of the hood has been folded into the pocket (see Figs. 11 and 12). The front side 44 of the hood preferably has two lens openings 64, 66 which may be reinforced by any suitable reinforcement rings 68, 70. These lens openings serve the purpose of permitting two gas mask lenses 72, 74 to be secured to the hood in such a manner that its wearer may see through it without allowing smoke or toxious gases to enter the hood through these openings. These lenses are shown operatively connected to the hood in Figure 13.

An opening 76 is also provided in the pattern in order that filtered air may enter the hood through the filter (not shown) of suitable gas mask canister means, such as the canister 78 shown in Figure 13. This opening 76 is also provided with a reinforcement ring in order that the canister may be more securely clamped to the hood in an airtight manner.

We have also provided on the outside of the hood a plurality of belt straps 84 to receive any suitable tie means 86 which may be looped around the lower portion of the hood. This tie means permits the hood to be suitably contracted around the neck in such a manner that exhaled air breathed from the nostrils into the hood will be expelled downwardly between the neck and the hood into the outer atmosphere. In operation, as the breathed air is exhaled by the wearer it builds up a slightly greater than atmospheric pressure inside the hood. By reason of this excess pressure, the breathed air is forced out of the hood in such a manner as to prevent the outer air from passing into the upper portion of the hood during the inhalation phase. This arrangement makes certain that no smoke or noxious gas reaches the nostrils of the wearer. It is exceedingly effective and it has been proven under repeated tests to provide approximately one million times better protection from noxious gas than it is possible to provide with only a gas mask.

This hood may be folded and incased within its pocket by any suitable method. However, the most convenient method which we know of, is the one shown in Figures 4 to 12 inclusive. In carrying out this method the hood is first turned front side up, then folded in sequence along the longitudinal extending fold lines 87, 88 and then folded transversely along the extending fold lines 90, 94, 96, 98 in the manner which will be clearly understood by referring to Figures 4 to 9 inclusive. After being folded into the position shown in Figure 9, the pocket may be conveniently turned inside out over the folds of the hood and then securely closed by snapping the snap fasteners together (see Figs. 11 and 12). However, if it is preferred, and it may be with a small pocket, the pocket may be turned inside out before making the last folds.

A slight modification of our invention as applied to a combination gas mask hood and carrier is shown in Figure 38. The hood 100 is identical to the hood 40 except that it is provided with an inner partition 102 which may be made of any suitable material.

This partition proves certain advantages. It adapts the hood to be used immediately for a short time either during a gas attack or in a smoke filled room in the event that no eyelenses or gas mark lens are provided with the hood, or, if any of these gas protective auxiliaries (not shown in Fig. 35) become inoperative. Since the weaher has only to insert his head between the partition 102 and the backside 104 of the hood and then loosely tighten the hood around his neck. This arrangement gives a temporary but vitally important protection which enables the wearer to remove an unconscious person from a smoke filled room or to reach an airtight room in case of a gas attack. This partition also adapts the hood to be used as a market bag for carrying both relatively large and relatively small packages, since quite small articles which might fall out of the hood through the openings 64, 66 or 76 may be safely carried in the back compartment.

Our pocket improvement may be just as effectively incorporated in "single layer" articles such as comforts, blankets and sheets and which may be spread out on a table in a single layer in contradistinction to "two layer" articles such as hoods, sacks and dresses which under the same circumstances always have two layers, one above the other. To illustrate how our improvement may be conveniently applied to "single layer" articles we have chosen a blanket 106 which is made from a pattern 108. This pattern is preferably rectangular in shape except that it is provided with a pocket flap 110 which extends from a corner portion 112. The flap, when folded back upon and sewn to the corner portion, serves as the front side 114 of a pocket having a lapel 116. In order that the pocket may be kept closed male snap fastener elements 118 are inserted in the corner portions 112 and female fastener elements 120 are inserted in the lapel portion. It should be noted that these fasteners are so attached that, when the lapel is turned back into the pocket and they are snapped together, the front surface 122 of the lapel is secured directly adjacent to the corner portion. It should also be noted that (see Figs. 23 and 24) this arrangement permits the lapel to be snapped to the main body 124 of the blanket after all except the pocket corner 112 has been inserted in the pocket.

Figure 17:
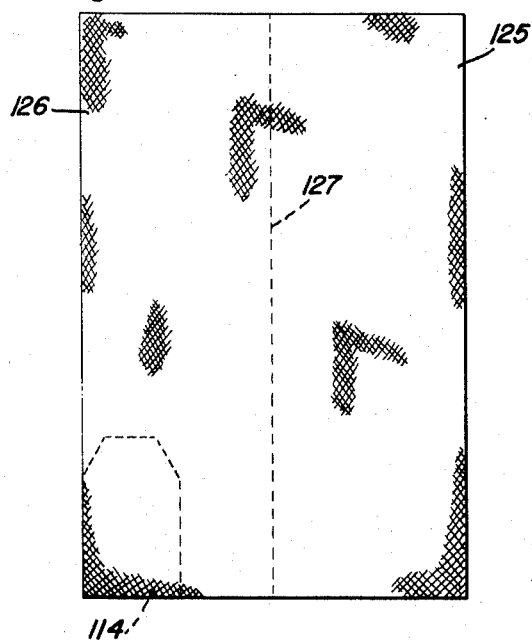
Figure 23:
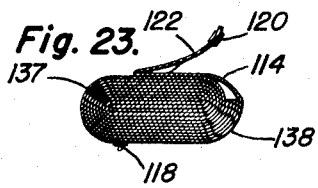
Figure 24:
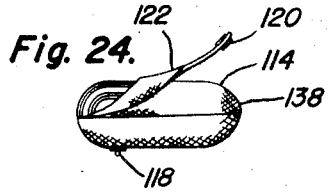
Figure 25:
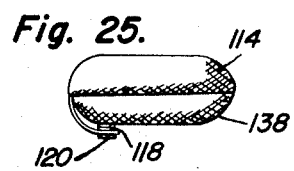

The blanket may be folded and inserted in its pocket in a number of ways but we preferably use the method indicated in Figures 17 to 25 inclusive. In carrying out this method, we first flatten the blanket out on a table or the like with its pocket on the lower side. Then we fold the right side 125 (as seen in Fig. 17) of the blanket over upon its left side 126 along its longitudinal center line 127. We now fold the blanket again (see Figs. 15, 18), this time at the longitudinal folding lines 128, 129 as indicated in Figure 19. Then the blanket may be folded downwardly from the top along the horizontal folding lines 130, 132 and 134 and the pocket turned inside out around the bottom portion of the blanket. The upper folded portions of the blanket are now inserted into the blanket while folding these portions inwardly along the folding line 136 (see Figs. 23, 24). The lapel of the pocket may then be brought over portion 137 of the thus formed bundle 138 which is to be covered by the lapel and the lapel may be fastened to the blanket corner portion forming the inner side of the pocket by pressing the snap fasteners together as indicated in Figure 25. In another modification, the pocket is located, not in a corner or marginal portion of the article but in a more central portion. This modification is depicted in Figures 26 to 37, inclusive, incorporated in a nightgown 140 having its main body portion 142 provided with two sleeves 144, 146 and a more or less centrally located pocket 148. The front side 150 of this pocket includes a lapel 152 and the pocket is located on the front side of the gown 154 just below its center horizontal folding line 156 and to the right of its center vertical folding line 158 (see Figs. 26, 27 and 28). The front side 150 and back side 160 of the pocket (which is a part of the front side 154) are provided respectively with snap fastener elements 162 and 164 whereby the garment may be snugly secured in its pocket as shown in Figures 36 and 37.

A convenient method of inserting the gown in its pocket is illustrated in Figures 28 to 37 inclusive. According to this method the gown as seen in Figure 26 is first turned over with its front side 154 down as shown in Figure 28. Then, with its sleeves unfolded, the right side 165 of the gown as shown in Figure 28 is turned over on its left side 166 and overlaps the left side as shown in Figure 29. The garment, with the sleeves still unfolded, is now folded in the reverse direction along the vertical folding lines 168, 170 as indicated in Figure 30. The sleeves are then folded along the diagonal folding line 172 to lie over, and parallel to the folded garment and the bottom part of the gown is folded up along the lowermost folding lines 174, 175. The garment is then folded from its top along the horizontal folding lines 176, 177, and from the bottom upwardly along the folding line 175.

The pocket is now turned inside out around its lower end (if this has not previously been done) in a manner which will be readily understood by referring to Figure 35 and the upper folded portions of this garment are inserted in the pocket by folding the gown into the pocket along the horizontal folding line 156 as seen in Figure 36. Since this places all the folded portions of the garment in the pocket as shown in Figure 36, the lapel is locked by the snap fasteners to the main body portion of the gown to provide the securely closed pocket 178 shown in Figure 37.

We have now shown our improvement incorporated in a hood, a blanket and a garment.

It will be noted that in each embodiment the pocket has a lapel; and that snap fasteners are provided both on the lapel and on the back side of the pocket of the article coact with each other and hold the pocket closed after the other parts of the article have been folded inside it.

It will also be noted that these fasteners are so arranged that they will snap the outside of the lapel to the front side of the back portion of the filled pocket and that this arrangement enables the pocket to be snapped closed after the other portions of the article have been inserted into the pocket.

It will also be noted that our pocket may be located in either a marginal portion or in an inner portion of the article.

Attention is also directed to the fact that the pocket lapel may be easily increased both in width and in length and thereby have its capacity increased to the desired extent.

It is, of course, apparent that the nature of our invention is such that it may be used in dry goods articles other than those shown and described herein and that therefore many substitutions and modifications may be made by those skilled in the art without departing from the scope of the following claims.

We claim:

1. A flexible, foldable gas mask hood having an open neck portion which can be closed about the head of the wearer, said hood having lens and air openings and comprising a foldable main body section having a small attached flap, said flap being secured on three of its sides to the body portion of the hood to form a pocket, the fourth side of said flap constituting a lapel equipped with a fastener element, a second complementary fastener element attached to the body portion of the hood within said pocket such that when the pocket is turned inside out over the folded hood the fastener elements are in position to engage and to form a closed package for the hood.

2. A foldable gas mask hood in accordance with claim 1 wherein said hood is provided with an inner partition so placed that it can be made to cover the lens and air openings in said hood.

References Cited in the file of this patent

UNITED STATES PATENTS

| | | |
|---|---|---|
| 293,386 | Wetzler | Feb. 12, 1884 |
| 1,025,643 | Presmont | May 7, 1912 |
| 1,112,805 | Kaufman | Oct. 6, 1914 |
| 1,246,871 | Cabelinsky | Nov. 20, 1917 |
| 1,374,172 | Andrews | Apr. 12, 1921 |
| 1,643,440 | Baldwin | Sept. 27, 1927 |
| 1,930,942 | Pringle | Oct. 17, 1933 |
| 2,109,951 | Truesdell et al. | Mar. 1, 1938 |
| 2,183,418 | Williams | Dec. 12, 1939 |

FOREIGN PATENTS

| | | |
|---|---|---|
| 14,206 | Great Britain | June 15, 1911 |